(12) United States Patent
Schartner et al.

(10) Patent No.: US 10,704,306 B2
(45) Date of Patent: Jul. 7, 2020

(54) TUNABLE STAY FOR AIRCRAFT COMPARTMENT CLOSURE

(71) Applicant: Gulfstream Aerospace Corporation, Savannah, GA (US)

(72) Inventors: Todd Schartner, Savannah, GA (US); Clint Rupp, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 1143 days.

(21) Appl. No.: 15/077,505

(22) Filed: Mar. 22, 2016

(65) Prior Publication Data
US 2017/0275934 A1    Sep. 28, 2017

(51) Int. Cl.
*E05C 19/16* (2006.01)
*B64D 11/00* (2006.01)
*B64C 1/14* (2006.01)
*E05B 63/00* (2006.01)
*E05C 17/56* (2006.01)

(52) U.S. Cl.
CPC ............ *E05C 19/16* (2013.01); *B64C 1/1407* (2013.01); *B64D 11/00* (2013.01); *E05B 63/0056* (2013.01); *E05C 17/56* (2013.01); *Y10S 292/19* (2013.01); *Y10T 292/11* (2015.04)

(58) Field of Classification Search
CPC ....... E05C 19/16; E05C 17/56; B64C 1/1407; B64D 11/00; Y10T 292/11; E05B 63/0056; Y10S 292/19
See application file for complete search history.

(56) References Cited

U.S. PATENT DOCUMENTS

| | | | | | |
|---|---|---|---|---|---|
| 2,514,927 | A | * | 7/1950 | Bernhard | E05B 53/001 292/251.5 |
| 2,519,435 | A | * | 8/1950 | Byrd, Jr. | E05C 19/16 16/82 |
| 2,673,377 | A | * | 3/1954 | Gaugler | E05C 19/16 292/251.5 |
| 2,693,382 | A | * | 11/1954 | Teetor | E05C 19/16 292/251.5 |
| 2,815,236 | A | * | 12/1957 | Lowinski | E05C 17/56 292/251.5 |

(Continued)

OTHER PUBLICATIONS

K&J Magnetics, Inc., DX08B-N52 Product Specification Sheet, Admitted Prior Art.

*Primary Examiner* — Kristina R Fulton
*Assistant Examiner* — Faria F Ahmad
(74) *Attorney, Agent, or Firm* — LKGlobal | Lorenz & Kopf, LLP

(57) ABSTRACT

A tunable stay device for an aircraft closure has a mounting base that is mountable to the closure or in an area of the aircraft in close proximity to the closure. The mounting base extends, at least in part, along a mounting axis. A holding element is mounted for movement along the mounting axis and configured to effect, at least in part, a hold force. An adjuster is mounted to at least one of the mounting base and the holding element and is configured and arranged to effect a change in position of the holding element with respect to the mounting base along the mounting axis. When the stay device is mounted to the closure or in the area of the aircraft in proximity to the closure, the hold force biases the closure in one of an open orientation and a closed orientation.

14 Claims, 5 Drawing Sheets

(56) References Cited

U.S. PATENT DOCUMENTS

| | | | | |
|---|---|---|---|---|
| 2,853,331 | A * | 9/1958 | Teetor | E05C 19/16 292/251.5 |
| 2,955,239 | A * | 10/1960 | Rouse | E05C 19/16 211/70.6 |
| 2,987,338 | A * | 6/1961 | Anderson | E05C 19/16 292/251.5 |
| 3,009,225 | A * | 11/1961 | Budreck | E05C 19/16 24/303 |
| 3,326,588 | A * | 6/1967 | Melville | E05C 19/16 292/251.5 |
| 4,455,719 | A * | 6/1984 | Morita | E05C 19/16 24/303 |
| 4,669,766 | A * | 6/1987 | Hanchett, Jr. | E05C 17/56 292/251.5 |
| 4,852,919 | A * | 8/1989 | Nimee | E05C 17/56 292/251.5 |
| 4,995,655 | A * | 2/1991 | Freeman | E05C 17/56 292/251.5 |
| 5,425,523 | A * | 6/1995 | Madey | G01B 11/275 248/183.1 |
| 5,887,917 | A * | 3/1999 | Luciana | E05C 17/56 16/82 |
| 5,944,368 | A * | 8/1999 | Hastings | E05C 17/56 292/251.5 |
| 6,658,697 | B2 * | 12/2003 | Liao | E05F 5/02 16/82 |
| 7,246,384 | B2 * | 7/2007 | Bentz | A42B 3/08 2/421 |
| 8,567,831 | B2 * | 10/2013 | Roti | E05C 17/56 16/82 |
| 8,864,188 | B2 * | 10/2014 | Redgrave | E05C 19/16 292/251.5 |
| 9,689,527 | B2 * | 6/2017 | Franklin | F16M 13/02 |
| 10,190,333 | B2 * | 1/2019 | Corwin, Jr. | E05B 15/022 |
| 2006/0170225 | A1 * | 8/2006 | Macken | E05C 19/16 292/251.5 |
| 2007/0007775 | A1 * | 1/2007 | Gallas | E05C 19/16 292/251.5 |
| 2009/0273194 | A1 * | 11/2009 | Patterson | E05C 19/16 292/251.5 |
| 2011/0214260 | A1 * | 9/2011 | Wang | A44C 5/2076 24/303 |
| 2016/0040461 | A1 * | 2/2016 | Kauppila | E05C 19/16 292/251.5 |
| 2016/0060910 | A1 * | 3/2016 | Abdelaziz | E05B 81/70 292/251.5 |

\* cited by examiner

TUNABLE STAY FOR AIRCRAFT COMPARTMENT CLOSURE

FIELD OF THE DISCLOSURE

This disclosure relates to aircraft environments, and particularly to closures for aircraft compartments.

BACKGROUND OF THE DISCLOSURE

Aircraft of various types operate in air environments that may cause movement (e.g., shifting and sliding) of onboard items (e.g., people and cargo) during flight. Loose items in designated areas (e.g., cockpit, passenger cabin, lavatory, etc.) of the aircraft may be contained or enclosed by closures of various types (e.g., sliding or hinged doors and so on). Various stays mechanism (e.g., latches, locks and other common mechanisms) may be used to keep the closures secure when in a closed orientation as well as to retain the closures in an open orientation.

SUMMARY OF THE DISCLOSURE

This disclosure provides a closure system for various compartments of an aircraft with an improved stay mechanism.

In one aspect the disclosure provides a tunable stay device for an aircraft closure. The stay device has a mounting base that is mountable to the closure or in an area of the aircraft in close proximity to the closure. The mounting base extends, at least in part, along a mounting axis. A holding element is mounted for movement along the mounting axis and configured to, at least in part, effect a hold force. An adjuster is mounted to at least one of the mounting base and the holding element and is configured and arranged to effect a change in position of the holding element with respect to the mounting base along the mounting axis. When the stay device is mounted to the closure or in the area of the aircraft in proximity to the closure, the hold force biases the closure in one of an open orientation and a closed orientation.

In another aspect the disclosure provides a closure system for an aircraft compartment having a closure mounted to a frame to move between open and closed orientations and a stay device mounted to the closure. The stay device includes a mounting base having a first end configured to engage the closure and a second end extending, at least in part, along a mounting axis. A holding element is mounted for movement along the mounting axis and configured to, at least in part, effect a hold force. An adjuster is mounted to at least one of the mounting base and the holding element and is configured and arranged to effect a change in position of the holding element with respect to the mounting base along the mounting axis. The hold force biases the closure in one of an open orientation and a closed orientation.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
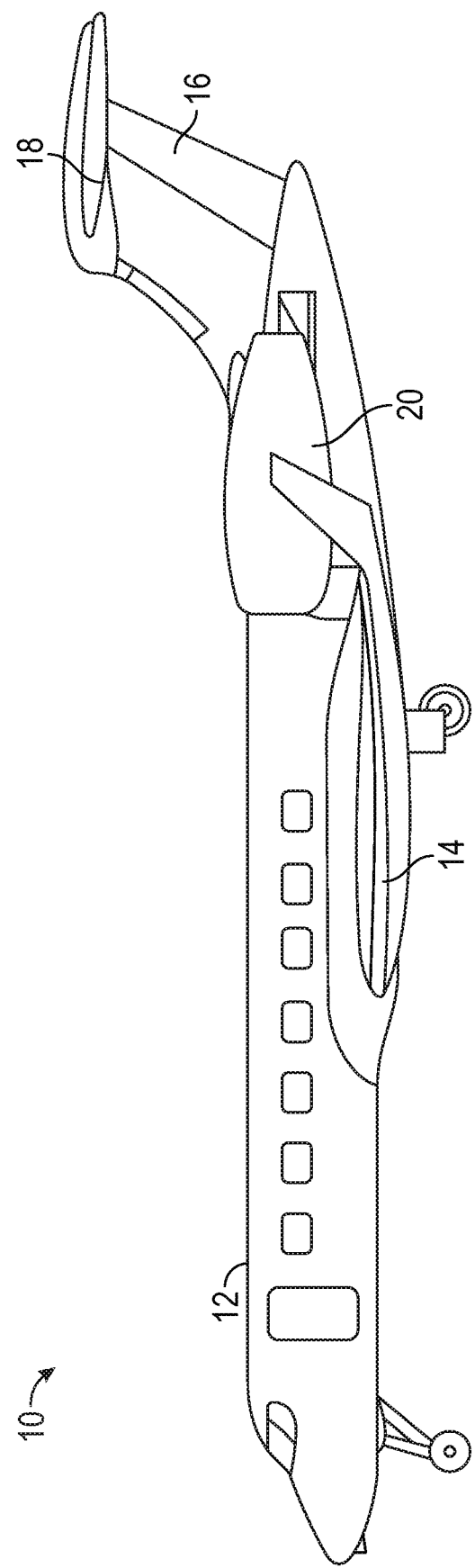
FIG. 1 is a side view of an example aircraft in which a closure system according to this disclosure may be incorporated.

The following describes one or more example embodiments of the disclosed aircraft compartment closure and stay device, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

As used herein, the term "axial" refers to a direction that is generally parallel to an axis of rotation, axis of symmetry, or centerline of a component or components. For example, in a cylinder with a centerline and opposite, circular ends, the "axial" direction may refer to the direction that generally extends in parallel to the centerline between the opposite ends. In certain instances, the term "axial" may be utilized with respect to components that are not cylindrical (or otherwise radially symmetric). For example, the "axial" direction for a rectangular housing containing a rotating shaft may be viewed as a direction that is generally in parallel with the rotational axis of the shaft. Furthermore, the term "radially" as used herein may refer to a direction or a relationship of components with respect to a line extending perpendicularly outward from a shared center line, axis, or similar reference. For example, two concentric and axially overlapping cylindrical components may be viewed as "radially" aligned over the portions of the components that axially overlap, but not "radially" aligned over the portions of the components that do not axially overlap. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominately in the respective nominal axial or radial direction.

Additionally, the term "annular" (and derivatives) are used herein to refer to the radial sides or surfaces of an annulus, for example, the outward and inward facing sides or surfaces of an annular body. In the case of an annular body that is symmetric about a central reference axis or centerline, these annular sides and surfaces may correspond with circumferential sides or surfaces thereof, which may also be considered the inner and outer diameter sides or surfaces.

Attitude fluctuations common in flight vehicles may cause on-board cargo and persons to shift while airborne. Various cabinets and compartments of the aircraft may be fastened or latched when closed to restrain or constrain the shifting items or persons. Even when opened, the cabinet and compartment doors may be fastened or otherwise secured to prevent the doors from being moved inadvertently by the motion of the aircraft. Stay mechanisms of various types may be used to hold such doors in place until moved manually.

Conventional stay mechanisms may suffer from various shortcomings. For example, stay devices that require manual latching by a person may be left unused or used improperly such that that the device is rendered ineffective. Stay devices that operate (e.g., latch or catch) by the opening or closing movement of the door avoid this. Magnetic stay devices are examples of such intrinsically operable stays. However, conventional magnetic stays may also suffer certain shortcomings, including, for example, providing insufficient holding power for certain applications, thereby leaving the door susceptible to inadvertent movement, or just the opposite, providing too much holding power such that the door is difficult to dislodge or separate from the stay, thus requiring extra or concentrated effort by a user to open and close the door. Even selecting the magnet to provide a set holding power does not solve the problem, since users of different size and strength may have a different perception of the amount of effort required to unseat the stay.

This disclosure provides a closure system for aircraft compartments with a tunable stay device. The stay device includes a holding element that, at least in part, provides a hold force for holding the closure system either open or closed. In certain embodiments, the hold force is a magnetic field or flux that effects a polar attraction to a coupling element, which is configured to receive and interact with the magnetic field, such as one or more additional magnets or magnetically permeable elements. It should be understood that the holding and coupling elements may be any of the same or different components that cooperate or interact to provide a mutual bond or connecting force. These elements may function in a similar manner depending on the construction of the closure system. In one configuration, the holding element of the stay device may be a magnet that generates a magnetic field that is interacted with by a magnetically permeable coupling element. In another configuration, the holding element may be a magnetically permeable element that interacts with a magnetic field generated by a magnetic element that is not part of the stay device. Additionally or alternatively, both holding and coupling elements may be field generating elements, but of compatible (e.g., opposite) polarity.

The closure system may be configured to fit to any suitable compartment, for example, including human occupied compartments (e.g., cockpit, lavatory, etc.) and cargo or other contents compartments (e.g., overhead bins, electronics cabinets, access panels, etc.). Irrespective of the type of compartment, the closure system may include a closure member (e.g., door, lid or other panel) and a frame member (e.g., door, cabinet or other access opening). The stay device may be mounted directly or indirectly to either the closure member, the frame member or to another member located in the near vicinity of the closure member. For example, a fixed cabinet or wall structure of the aircraft adjacent to the path of movement of the closure member when moving between open and closed orientations. In one example, the closure member may be an upright (e.g., vertical) hinged door to a lavatory compartment, and the stay device may be mounted to the door and interact with a wall structure of the aircraft positioned to be physically contacted by the stay device when the door is open. As noted, the hold power may be achieved by magnetic field force between a magnet in the stay device, a magnet in the wall structure, or magnets in the both the stay device and the wall structure.

In certain embodiments, the holding element (e.g., magnet, metallic piece, etc.) is mounted for adjustment into different positions within the stay device. For example, the holding element may be mounted for continuous variable positioning, or for distinct non-continuous positioning at pre-defined locations, along an axis along which the holding element is mounted so as to change its relative position with respect to the closure, and thereby, the coupling element. The physical mounting adjustment allows the hold force provided by the stay device to be tuned to a desired value to make the connection between the holding and coupling elements more or less strong. Tuning of the hold force thereby affords a stay device that may be preferentially set for a given user. Thus, a closure system with a user-specific stay arrangement is provided in a single stay device without requiring multiple mechanisms or interchanging of parts.

In certain embodiments, the stay device may be configured to facilitate tuning of the hold force without tools or modification to the manufacture, assembly or mounting of the stay device. For example, the holding element may be mounted so that it may be translated along its mounting axis by manipulation of another component of the stay device. In certain embodiments, rotation of an outer housing or barrel member may cause the holding element to shift or translate axially, thereby increasing or decreasing the gap between holding element and an outer end of the stay device (and thereby between the holding element and the coupling element counterpart). As mentioned, axial adjustment of the holding element may be made continuously (e.g., by threaded or grooved connection) or at pre-set positions (e.g., by bayonet or pin/slot connection).

With reference to the drawings, one or more example implementations of the closure system and stay device will now be described. While the example closure system and stay device are illustrated and described herein in the context of a particular aircraft, one skilled in the art will recognize that principles of the closure system and stay device disclosed herein may be readily adapted for use in other types of flight vehicles, including various air and space vehicles, as well as various other land and sea vehicles. Moreover, the example closure system and stay device are illustrated and described herein in connection with a hinged door for a lavatory compartment. However, the closure system and stay device may be used with other types of doors or closure members, and other types of compartments, than that shown and described. Moreover, the stay device is illustrated and described as used for holding the closure member in an open orientation, however, the stay device may also be used for holding the closure member in a closed orientation. As such, the present disclosure should not be limited to applications associated with aircraft or to the particular example aircraft, nor to lavatory compartments or the particular example lavatory, which is shown and described.

Referring now to FIG. 1, an example aircraft 10 is shown in which the disclosed closure system and stay device may be implemented. The aircraft 10 includes fuselage 12, which holds passengers and cargo, two main wings 14, which provide the lift needed to fly the aircraft 10, a vertical stabilizer 16 and two horizontal stabilizers 18, which are used for flight stabilization, and two engines 20, which provide the thrust needed to propel the aircraft 10 forward. Flight control surfaces are placed on the wings 14, the vertical stabilizer 16 and the horizontal stabilizers 18 to guide the aircraft 10. When the aircraft 10 is at rest, the effects of gravity on of the wings 14 apply a downward force on the fuselage 12, and during flight, lift forces overcome gravity and apply an upward force on the wings 14. This results in a change of the direction and potentially the magnitude of the force applied to the fuselage 12. Additionally, turbulence or other atmospheric conditions may apply varying forces to the fuselage 12 during flight. These forces may cause changes in position or location of items within the fuselage 12.

Figure 2A:
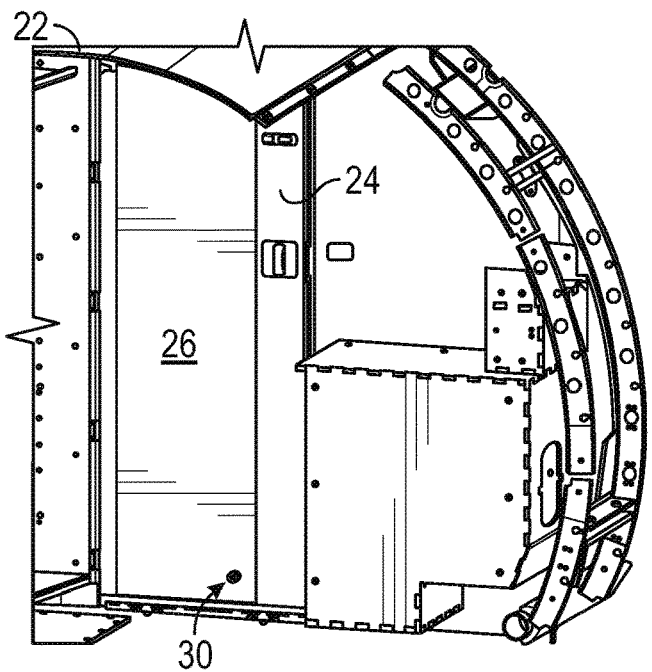
FIG. 2A is a partial perspective view of an example compartment of the aircraft of FIG. 1 having an example closure system shown in a closed orientation.
Figure 2B:
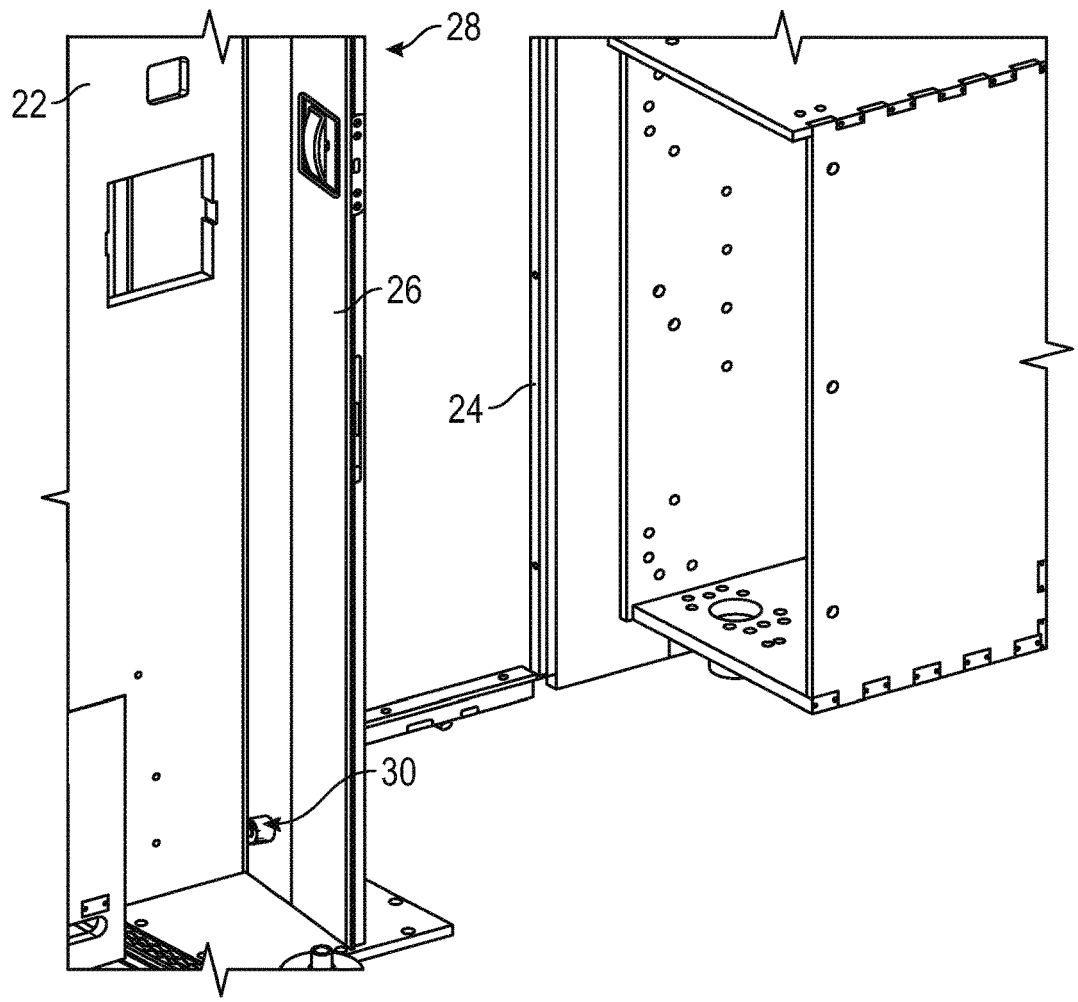
FIG. 2B is a partial perspective view thereof with the closure system shown in an open orientation.
Figure 3:
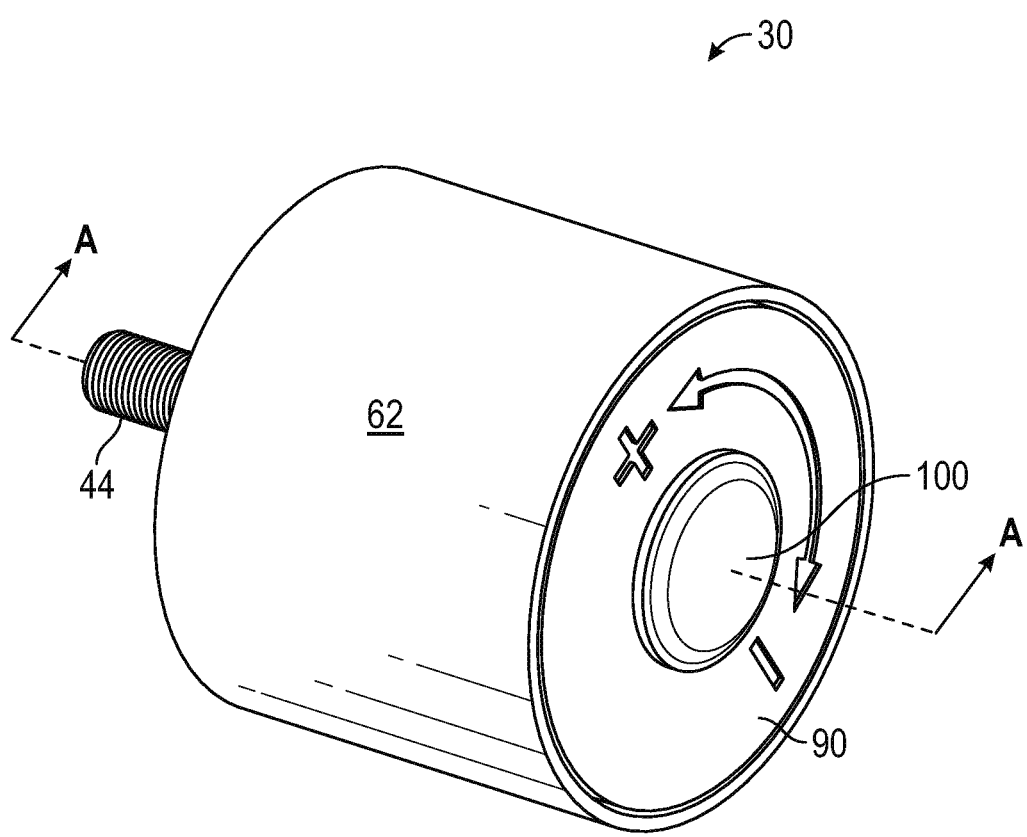
FIG. 3 is a perspective view of an example stay device for the closure system shown in FIG. 2.
Figure 4:
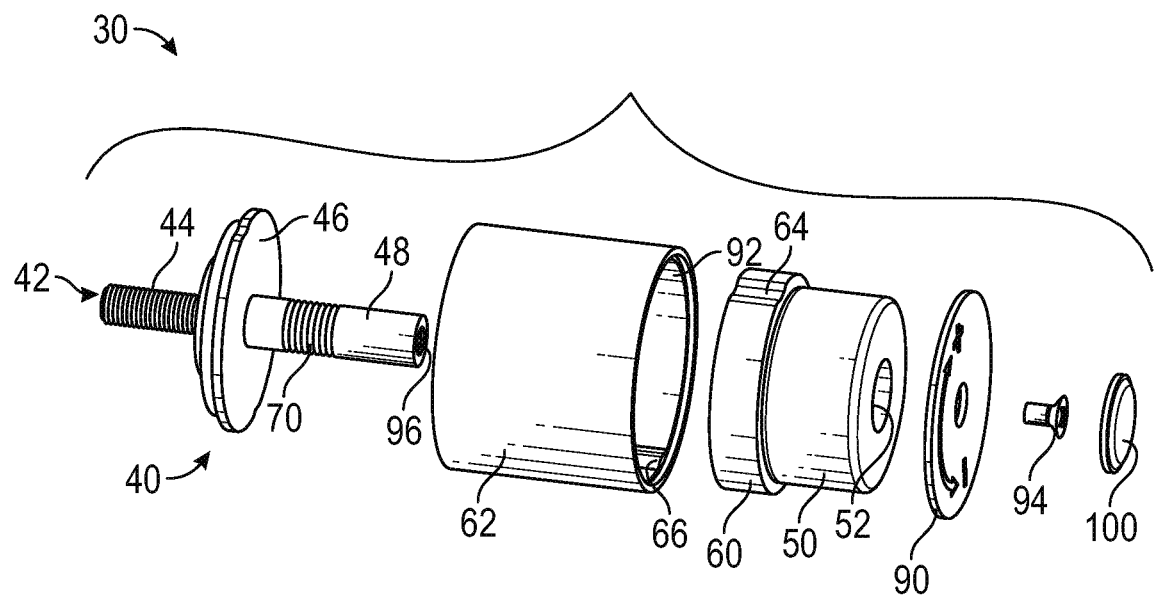
FIG. 4 is an exploded assembly view thereof.
Figure 5:
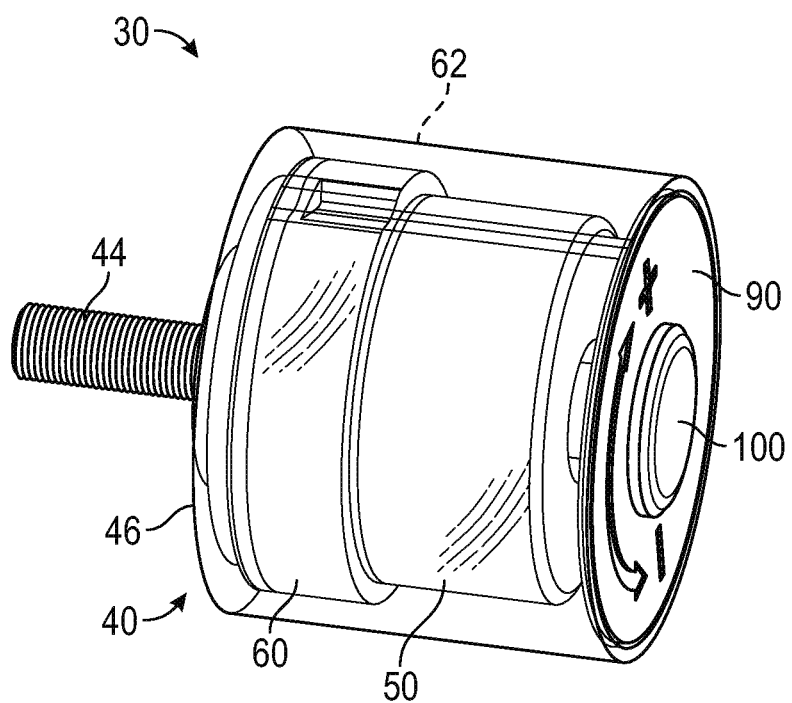
FIG. 5 is a perspective view of the example stay device as assembled with certain internal components being shown.

Referring also to FIGS. 2A and 2B, the aircraft 10 has a passenger cabin with various areas (e.g., galley, seating area, lavatory, etc.) defined by various bulkheads, including bulkhead 22 which includes an opening frame (e.g., door frame 24) for a hinged closure member (e.g., door 26) to close a lavatory area from an adjacent area of the passenger cabin. The FIGS. 2A and 2B thus illustrate one example of a closure system 28 according to this disclosure, with the door 26 shown in a closed orientation in FIG. 2A and an open orientation in FIG. 2B. Referring also to FIGS. 3-5, the closure system 28 includes a stay device 30, which includes as main components a mounting element, a holding element and an adjusting element.

The mounting element may be any suitably configured component capable of coupling the stay device 30 to either the closure member (e.g., door 26) or to an area of the aircraft 10 in proximity to the closure member (e.g., bulkhead 22). In the illustrated example, the stay device 30 includes a mounting base 40 having a spindle 42 that extends along a mounting axis "A". The spindle 42 has an outer end 44 that physically mounts to either the closure member or a fixed structure near the closure member. In the illustrated example, the outer end 44 of the spindle 42 mounts to the door 26 in a suitable location such that it will be able to contact an area of the bulkhead 22 when in an open orientation, as shown in FIG. 2B, which, as can be seen, may be at or near a lower corner of the non-hinged side of the door 26. The spindle 42 may physically connect to the door 26 in any suitable manner to effect a permanent or removable connection, including, for example, by welding, bonding, press-fit or other mechanical fastening technique. Moreover, the spindle 42 may make a direct connection or be connected by an intermediate device. In the illustrated example, the end 44 has threads at its outer periphery which allow the spindle 42 to thread into the door 26. The threaded end 44 may be self-tapping, forming an opening and a threaded connection as it is screwed into the door 26, or the threaded end 44 may be have conventional machine threads that thread into a tapped bore in the door 26, or into an insert (not shown) with a tapped bore that is embedded into the door 26. The mounting base 40 also has an enlarged planar feature 46 that separates the outer threaded end 44 of the spindle 42 from an inner end 48 which defines a mounting post for the holding element, as will be described. As shown, the planar feature 46 may be configured generally as a circular disk. In the illustrated example, the circular disk has a stepped outer periphery that reduces in diameter in the outward direction. The mounting base 40 may be configured either as an assembly of parts, or as a monolithic structure, such as by casting or extruding with various machining operations.

The holding element may be any suitably configured component capable of contributing to or proving a hold force tending to maintain the closure member (e.g., door 26) in a fixed orientation relative to the aircraft 10 (e.g., bulkhead 22) either when open or closed. As noted above, in certain embodiments, the holding element may be configured to contribute to or provide the hold force in the form of a field force, for example, either providing an attractive force to another coupling element or receiving an attractive force from a coupling element, or both. Further, in certain embodiments, the field force is a magnetic field or flux that effects a polar attraction of the holding element to the coupling element, which is configured to receive and interact with the magnetic field. In one configuration, the holding element of the stay device may be a magnet that generates a magnetic field that is interacted with by a magnetically permeable coupling element. In another configuration, the holding element may be a magnetically permeable element to interact with a magnetic field generated by a magnetic element. Both the holding and coupling elements may be field generating elements, but of compatible (e.g., opposite) polarity. In the case of a magnetic closure system then, the stay device may include a magnet that coorperates with either another magnet or a magnetically permeable element mounted to (or part of) another structure, or the stay device may have a magnetically permeable element that cooperates with a magnet mounted to another structure.

In the illustrated example, the stay device 30 includes a permanent magnet 50 having an annular configuration with a central opening 52 extending axially through the magnet 50 and sized to receive the inner end 48 of the spindle 42. The opening 52 is sized larger than the outer periphery of the inner end 48 of the spindle 42 to accept the spindle 42 and allow for relative axial movement of the magnet with respect to the spindle 42. The inner diameter of the opening 52 thus may be closely or loosely sized to the outer diameter of the spindle inner end 48, provided a non-movable connection is not established. It should be noted also that, although the illustrated example shows the magnet opening 52 as a smooth, cylindrical bore with a circular cross-section, the opening 52 may be of other non-circular section configurations or include various other intermediate features or projections.

In the illustrated example, the magnet 50 produces a magnetic field force that attracts structures made of magnetically permeable materials. In this example, the bulkhead 22 is made, at least in part, of a magnetically permeable material, such as a suitable metal or steel. The magnetic field of the magnet 50 acts on the metallic bulkhead 22, which thus serves as the coupling element counterpart to the magnet 50, to create the hold force of the stay device 30. Again, as noted, the magnet 50 could also cooperate with one or more additional magnets, which may be embedded or otherwise attached to the bulkhead 22 in a complementary location to the mounting position of the stay device 30, to create the hold force.

The adjusting element of the stay device 30 permits tuning of the hold force. The adjusting element (and the mounting and holding elements) of the stay device 30 may be arranged and configured in various ways provided the adjusting element may be implemented to effect a physical change in position of the holding element. A particular configuration is shown in the illustrated example in which the mounting base 40 is a monolithic structure with fixed outer 44 and inner 48 ends to which the magnet 50 is mounted and moved axially by the adjusting element with respect to the spindle 42. In other embodiments, for example, the mounting base may be configured as an assembly and the spindle inner end may be arranged to be axially movable with respect to its outer end such that the magnet may be fixed with respect to the spindle inner end rather than mounted for relative axial movement. In either case, however, the adjusting element is operated to effect the axial movement of the holding element.

In the illustrated example, the adjusting element includes an inner adjuster member 60 and an outer adjuster member in the form of an open-ended barrel 62 that also acts as a housing to conceal and protect the magnet 50. It should be understood that in certain embodiments the axial movement of the magnet 50 may be achieved using only the inner adjuster member 60, or by manipulation of the magnet 50 itself in other embodiments in which a suitable connection with the mounting base 40 is provided. In the example shown, the inner adjuster member 60 has a collar configuration and forms an assembly with the magnet 50 (e.g., by suitable bonding or other connection). The adjuster collar 60 has a larger outer peripheral dimension (e.g., diameter) than that of the magnet 50. One or more notches 64 (e.g., two spaced 180 degrees apart) are provided in the outer periphery of the adjuster collar 60 which receive and engage with one or more axial projections 66 on the inner periphery (e.g., diameter) of the housing barrel 62. It should be noted that male-female arrangement of the notches 64 of the adjuster collar 60 and the projections 66 of the housing barrel 62 may be reversed. In this example configuration then, rotation of the housing barrel 62 will cause rotation of the adjuster collar, and thereby the magnet 50, by inter-engagement of the notches 64 and projections 66. Further, the inner periphery of the adjuster collar 60 is configured to be in engagement with the inner end 48 of the spindle 42 (see FIGS. 6A and 6B) so as to convert the rotational input to the housing barrel 62 into axial movement of the magnet 50. As already mentioned, this can be accomplished in various ways, including relative rotation of the outer 42 and inner 48 ends of the spindle 42. In the illustrated example, however, the spindle inner end 48 is fixed and a threaded connection is provided between the inner periphery of the adjuster collar 60 and a threaded section 70 of the inner end 48 of the spindle 42. As will be understood, rotational input via the housing barrel 62 and the adjuster collar 60 will cause the threads at the threaded section 70 to engage and move the adjuster collar 60 and the magnet 50 axially toward or away from the mounting base 40 depending on the direction of rotation. The threaded connection thus affords essentially continuous and infinite axial position adjustment. As noted, however, other pre-defined or non-continuous axial adjustments may be provided using other engagement techniques. As one example, the inner end of the spindle and the adjuster collar (or the magnet) may interconnect at one of multiple pre-defined locations via a pin and slot or bayonet type connection or other non-threaded connection.

Figure 6A:
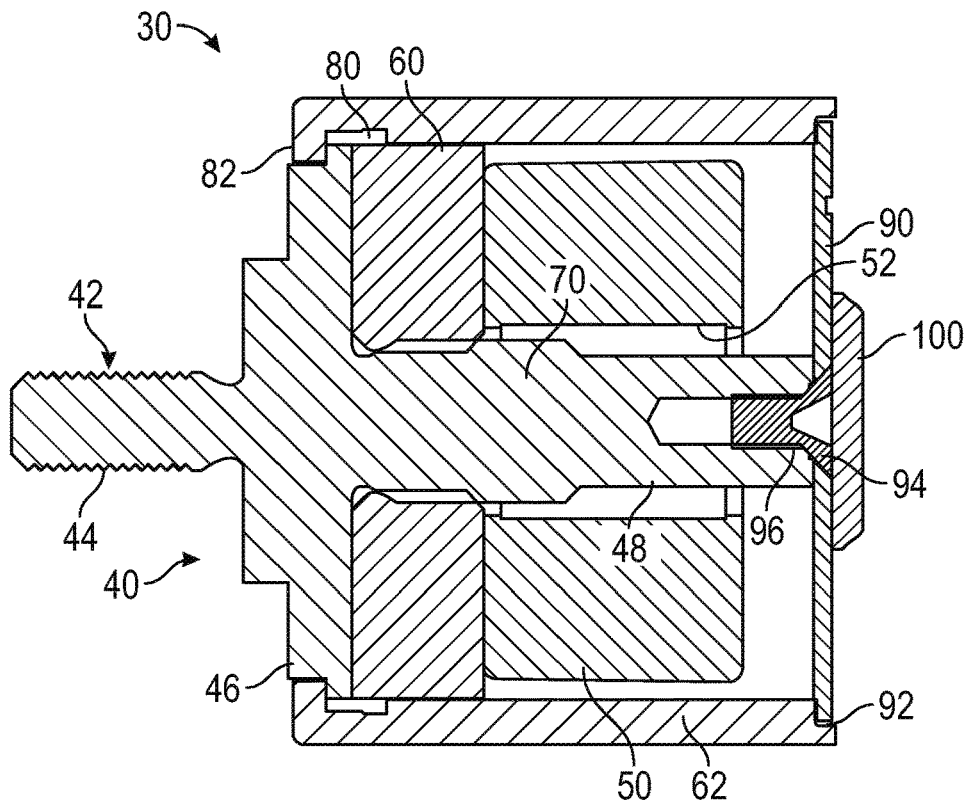
FIGS. 6A and 6B are axial sectional views taken along plane A-A of FIG. 3 showing the stay device in first and second adjusted orientations.
Figure 6B:
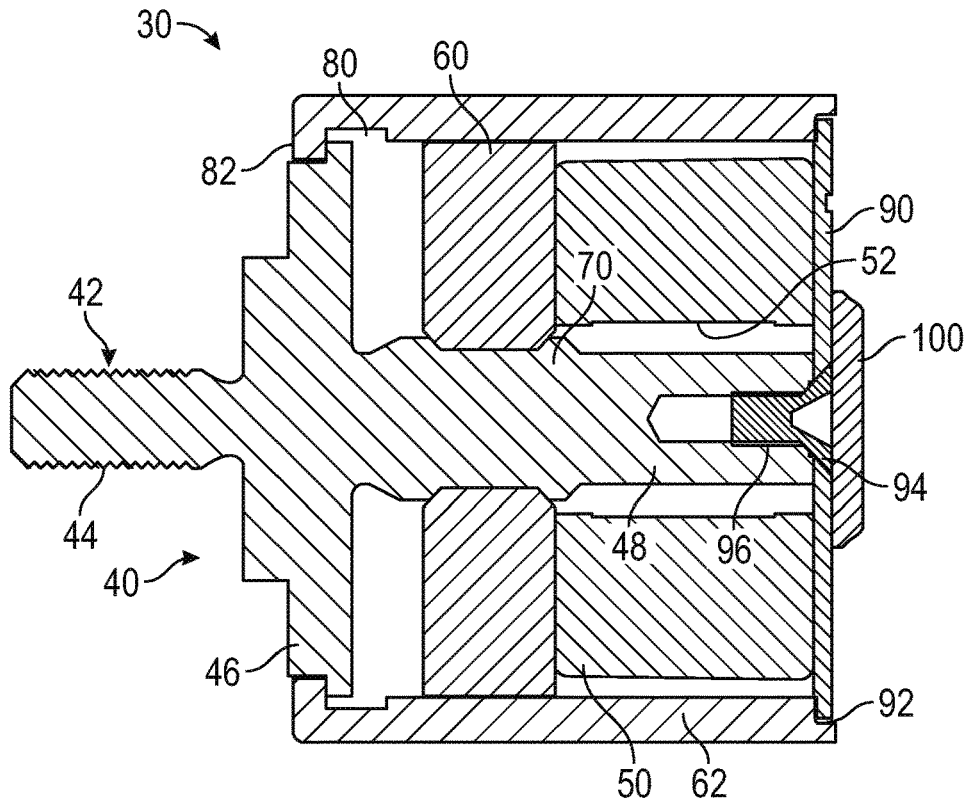

In the illustrated example, the stay device 30 is assembled as a self-contained, discreet package. In particular, as shown in FIGS. 6A and 6B, the housing barrel 62 rotatably mounts to the mounting base 40 at a groove 80 formed in the inner periphery of the housing barrel 62 that receives the outer periphery of the disk 46. The stepped periphery of the disk 46 inter-fits with a radially inwardly projecting end wall 82 of the housing barrel 62 to prevent axial sliding of the housing barrel 62 with respect to the mounting base 40 in one direction (to the right in FIGS. 6A and 6B). A circular cover plate 90 is mounted into an end groove 92 at the other end of the housing barrel 62 and is secured by a suitable mechanical connection, such as a set screw 94 threaded into a tapped bore 96 in the inner end 48 of the spindle 42. With the cover plate 90 in place, the magnet 50, adjuster collar 60 and housing barrel 62 are captured and mounted onto the inner end 48 of the spindle 42. The set screw allows for access and removal of the magnet 50, however, other removable or non-removable connections may be made (e.g., welding, bonding, press-fit and so on). A bumper 100, such as made of a compliant or deformable material or of a high-wear material, may also be mounted to the cover plate 90 via suitable connection (e.g., bonding and the like).

In operation, the hold force of the stay device 30 is adjusted or tuned as follows. Manually rotating the housing barrel 62 in either clockwise or counter clockwise direction rotates the adjuster collar 60 via engagement of the notches 64 and projections 66. Engagement of the adjuster collar 60 with the threaded section 70 of the inner end 48 of the spindle 42 causes the adjuster collar 60 and the magnet 50 to translate axially toward or away from the mounting base 40 from a position closest to the mounting base 40 and effecting the lowest hold force (as shown in FIG. 6A) to a position farthest from the mounting base 40 and effecting the greatest hold force (as shown in FIG. 6B), and any position in between. In the illustrated example, clockwise rotation of the housing barrel 62 moves the magnet 50 away from the mounting base 40 and thus increases the hold force of the stay device 30, while counter-clockwise rotation of the housing barrel 62 moves the magnet 50 toward the mounting base 40 and decreases the hold force.

As one non-limiting example, the magnet 50 travels approximately ⅜ inches (10 mm) between the positions shown in FIGS. 6A and 6B, and the magnet 50 is a permanent magnet made from an alloy of neodymium, iron and boron sized at approximately a one inch (25.4 mm) diameter and a half inch (12.7 mm) thick providing approximately 20 to 65 pounds of hold force in the respective positions. The other components of the stay device 30 may be made of materials with generally no or low magnetic permeability, such as a suitable aluminum alloy.

Thus, various embodiments of the disclosed closure system and stay device have been described in which the hold force of the stay device may be tuned to provide more or less force tending to hold the closure member in an open or closed orientation, and thus provide more or less resistance to the user in opening or closing the closure member. The hold force may be provided by a magnetic coupling of a holding element in the stay device (either a magnet or magnetically permeable element) and a counterpart coupling element (also either a magnet or magnetically permeable element). The stay device may be mounted directly to the closure member or to various structures in proximity to the closure member when in open or closed states. Various arrangements configurations have been described for tuning the hold force of the stay device, including an adjuster arrangement with engaging barrel and collar components that impart axial translation to the magnet from rotational input.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A tunable stay device for a closure of an aircraft, comprising:
    a mounting base extending, at least in part, along a mounting axis and mountable to the closure or an area of the aircraft in proximity to the closure;
    a holding element mounted for movement along the mounting axis and configured to, at least in part, effect a hold force; and
    an adjuster mounted to at least one of the mounting base and the holding element and configured and arranged to effect a change in position of the holding element with respect to the mounting base along the mounting axis;
    wherein, when the stay device is mounted to the closure or in the area of the aircraft in proximity to the closure, the hold force biases the closure in one of an open orientation and a closed orientation, wherein the holding element is configured to effect the hold force with cooperation from a coupling element located at the closure or in the area of the aircraft in proximity to the closure, wherein the holding element is a magnet having an opening and the coupling element is one of a magnet and a magnetically permeable element and
    wherein the mounting base has a mounting post extending along the mounting axis that is received in the opening of the magnet, the mounting post having an engagement feature for adjustably mounting the magnet to the mounting base.

2. The device of claim 1, wherein the engagement feature includes external threads at the mounting post that mate with internal threads at the magnet opening; and
    wherein the adjuster is configured to impart to the magnet a rotational force applied to the adjuster so as to effect movement of the magnet with respect to the mounting post along the mounting axis.

3. The device of claim 2, wherein the adjuster includes an inner adjuster member mounted to the magnet.

4. The device of claim 3, wherein the adjuster further includes an outer adjuster member circumferentially disposed about the magnet and configured to mechanically interface with the inner adjuster member to transfer rotational force applied to the outer adjuster member to the inner adjuster member and thereby to the magnet.

5. The device of claim 4, wherein the outer adjuster member is a housing barrel and the inner adjuster member is a collar having an outer peripheral surface that is, at least in part, radially further from the mounting axis than an outer peripheral surface of the magnet; and
    wherein the outer adjuster member includes an engagement feature of a complementary configuration to an engagement feature of the inner adjuster member such that the rotational force is transferred by engagement of the engagement features.

6. The device of claim 5, wherein the engagement features of the outer and inner adjuster members include a radial projection and a radial groove sized to receive the radial projection.

7. The device of claim 6, further including a cap mounted to the housing barrel to enclose the magnet.

8. The device of claim 7, wherein the mounting post includes an internally threaded opening that receives a threaded fastener to clamp the cap to the housing barrel.

9. The device of claim 8, wherein the mounting base, the outer and inner adjuster members, and the cap are made of magnetically impermeable material.

10. A closure system for an aircraft compartment, comprising:
    a closure mounted to a frame to move between open and closed orientations; and
    a stay device mounted to the closure, the stay device including:
        a mounting base having a first end configured to engage the closure and a second end extending, at least in part, along a mounting axis;
        a holding element mounted for movement along the mounting axis and configured to, at least in part, effect a hold force; and
        an adjuster mounted to at least one of the mounting base and the holding element and configured and arranged to effect a change in position of the holding element with respect to the mounting base along the mounting axis;
    wherein, when the stay device is mounted to the closure or in the area of the aircraft in proximity to the closure, the hold force biases the closure in one of an open orientation and a closed orientation, wherein the holding element is configured to effect the hold force with cooperation from a coupling element located at the closure or in the area of the aircraft in proximity to the closure, wherein the holding element is a magnet having an opening and the coupling element is one of a magnet and a magnetically permeable element;
    wherein the mounting base has a mounting post extending along the mounting axis that is received in the opening of the magnet, the mounting post having an engagement feature for adjustably mounting the magnet to the mounting base;
    wherein the engagement feature includes external threads at the mounting post that mate with internal threads at the magnet opening; and
    wherein the adjuster is configured to impart to the magnet a rotational force applied to the adjuster so as to effect movement of the magnet along the mounting post in the direction of the mounting axis.

11. The assembly of claim 10, wherein the closure is a door hinged to the frame and pivots between open and closed orientations.

12. The assembly of claim 10, further including an insert inset in the closure to which the first end of the mounting base couples to mount the stay device to the closure.

13. The assembly of claim 10, wherein the adjuster includes:
    an inner adjuster member mounted to the magnet; and
    an outer adjuster member circumferentially disposed about the magnet and configured to mechanically interface with the inner adjuster member to transfer rotational force applied to the outer adjuster member to the inner adjuster member and thereby to the magnet;
    wherein the outer adjuster member is a housing barrel and the inner adjuster member is a collar having an outer peripheral surface that is, at least in part, radially further from the mounting axis than an outer peripheral surface of the magnet;

wherein the outer adjuster member includes an engagement feature of a complementary configuration to an engagement feature of the inner adjuster member such that the rotational force is transferred by engagement of the engagement features; and wherein the engagement features of the outer and inner and adjuster members include a radial projection and a radial groove sized to receive the radial projection.

14. The assembly of claim 13, further including a cap mounted to the housing barrel to enclose the magnet;

wherein the mounting post includes an internally threaded opening that receives a threaded fastener to clamp the cap to the housing barrel.

\* \* \* \* \*